March 20, 1951 — A. POZARIK — 2,545,673
OPHTHALMIC ATTACHMENT
Filed May 20, 1949
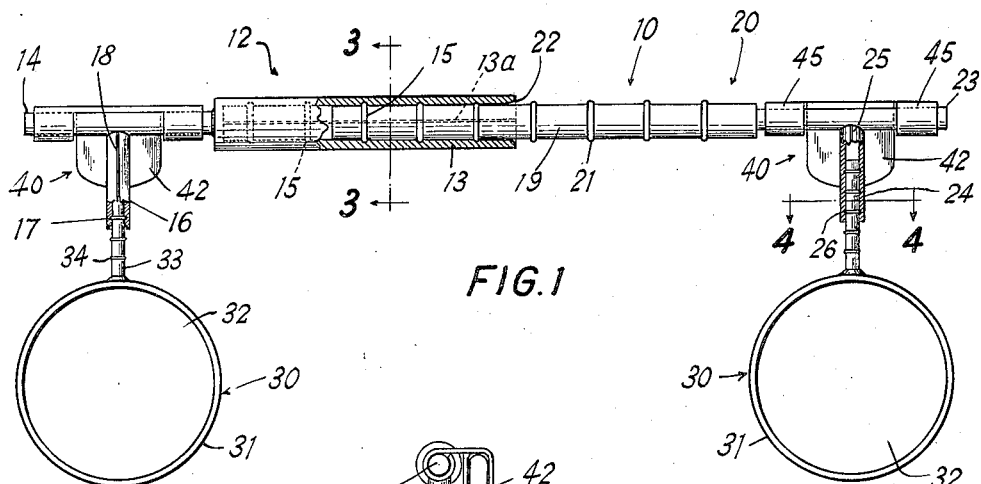
INVENTOR.
ALFRED POZARIK
BY Lou Casper
ATTORNEY Patented Mar. 20, 1951

2,545,673

UNITED STATES PATENT OFFICE 2,545,673

OPHTHALMIC ATTACHMENT

Alfred Pozarik, New York, N. Y., assignor of forty-five per cent to Riverdale Technical Corporation, New York, N. Y.; forty-five per cent to Alfred Pozarik, Hollis, N. Y., and ten per cent to Alexandre Saccard, New York, N. Y.

Application May 20, 1949, Serial No. 94,375

13 Claims. (Cl. 88—41)

This invention relates to ophthalmic attachments for spectacles.

An object of this invention is to provide an ophthalmic attachment which may be removably attached to ophthalmic spectacles of various sizes, and including a pair of accessory lenses which may be selectively swung in front of the spectacle lenses, or which may be swung forwardly and upwardly out of the way, when not in use.

Yet another object of this invention is to provide an ophthalmic attachment of the character described in which the accessory lenses may be moved toward or away from each other, or may be adjusted up and down with respect to the centers of the spectacle lenses, and in which the accessory lenses may be furthermore swung down in front of the spectacle lenses or upwardly and forwardly away from the spectacle lenses.

Yet another object of this invention is to provide a strong, rugged and durable ophthalmic attachment of the character described, which may be readily mounted on a spectacle frame and which may be easily removed therefrom, which shall be relatively inexpensive to manufacture, easy to manipulate, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of the invention will be indicated in the following claims.

In the drawings in which is shown various illustrative embodiments of this invention, Fig. 1 is a front elevational view of an ophthalmic attachment for spectacle frames embodying the invention;

Fig. 2 is an end view thereof showing the same mounted on a spectacle frame;

Fig. 3 is a cross-sectional view taken on line 3—3 of Fig. 1;

Fig. 4 is a cross-sectional view taken on line 4—4 of Fig. 1;

Fig. 5 is a perspective view of one of the ophthalmic mounting brackets forming the invention;

Fig. 6 is a front elevational view of the bracket;

Fig. 7 is a top plan view of the bracket; and

Fig. 8 is an end elevational view of said bracket; and Fig. 9 is a vertical cross-sectional view of a modification.

Referring now in detail to the drawing, 10 designates the ophthalmic attachment embodying the invention which is mountable on the lens frames of a spectacle 11. The attachment 10 comprises a member 12 having a longitudinally tubular portion 13, integral therewith and split longitudinally as at 13a, and a longitudinal co-axial stem 14 at one end of said tubular portion. The tubular portion 13 is formed with a series of equally spaced annular internal grooves 15, for the purpose hereinafter appearing.

Integrally formed with the stem 14 and extending downwardly at right angles thereto is a tube 16 longitudinally split as at 18. Projecting into the tube 13 is one end 19 of a member 20. Said portion 19 of the member 20 is formed with a series of annular beads 21 which are adapted to snap into the grooves 15. Tube 16 has internal, spaced annular grooves 17.

The tube 13 may be made of resilient material such as metal or synthetic plastic and is inherently resilient. The longitudinal split 13a therein permits portion 19 to be inserted progressively into the tube. The mouth of the tube may be flared as at 22 to facilitate insertion of portion 19 into the tube 13.

Extending from portion 19 of member 20 is a co-axial integral stem 23. Extending downwardly from stem 23 at right angles thereto is a tube 24. The tube 24 is longitudinally split as at 25. Said tube 24 is formed with internal annular grooves 26.

Mounted on each of the stems 16 and 24 is an accessory lens member 30. The members 30 are similar and only one therefore will be described. Each member 30 comprises an annular rim 31 carrying the lens 32. Extending from the rim 31 is a stem 33 formed with equally spaced beads 34. The stem 33 may be inserted upwardly into the tube 16 or 24. The beads 34 are spaced apart the same as are the grooves 17 or 26, so that the position of the lens 30 may be adjusted relative to the tubes 16 or 24.

It will be noted that the spacing of the beads 21 is the same as the spacing of the grooves 15, so as to permit the adjustments of members 12 and 20 longitudinally so as to bring the lenses 30 closer together or farther apart.

Means is provided for mounting members 12 and 20 on the spectacle frame 11. There is hence provided a pair of similar brackets 40. Each bracket 40 comprises a top wall 41 from which there extends downwardly, a pair of spaced parallel tongues 42 and 43, forming therebetween a channel 44. The top wall 41 extends forwardly on opposite sides of the front tongue 42 and is rolled to form a tube 45. Thus, each bracket 40 is formed with a pair of co-axial spaced bearing tubes 45.

The stem 14 passes through the tubes or sleeves 45 of one of the brackets 40 and the stem 16 passes downwardly therebetween and in front of the front tongue 42. The stem 23 passes through the spaced sleeves 45 of the other bracket 40 with the tube 24 passing down therebetween and in front of the front tongue 42. The brackets 40 may be frictionally engaged with the lens frames of the spectacle frame 11 since the upper portions of the spectacle frames will be received in the channels 44 of the brackets 40.

The brackets frictionally engage the spectacle frame. For various size spectacle frames, members 12 and 20 may be adjusted for elongation or contraction. Furthermore, each of the accessory lens frames 30 may be adjusted up and down independently of the other. Furthermore, each of the spectacle members may be swung upwardly and forwardly about the axis of members 12 and 20. They may be swung up together or, if desired, one may be swung down and the other swung upwardly and forwardly.

In Fig. 9 there is shown a lens holder 30, comprising a ring 31 and stem 33 formed with usual annular head 34. Mounted on ring 31 is a telescope or magnifying lens holder 50 for use at the opera or at race tracks. The holder 50 may be of usual construction and comprises an externally screw threaded sleeve 51 to which is secured an outer internally threaded sleeve 52. Fixed to sleeve 52 is a knurled ring 53 carrying magnifying lenses 54 held in place by a bezel 55.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, what I claim as new and desire to protect by Letters Patent of the United States is:

1. An ophthalmic attachment for spectacle frames comprising a pair of brackets having means to frictionally engage a spectacle frame, a member rotatably mounted on each of said brackets, one of said members having means telescoped within the other to coaxially connect said members for relative longitudinal and rotary movement, and an accessory lens holder attached to each of said members and rotatable therewith about its bracket.

2. In combination, a pair of brackets, each bracket being formed with a channel and with a pair of spaced bearings, a pair of members each having a stem portion journalled in the bearings of one of said brackets, said members having mutually telescoped portions connecting said members together in relative rotary and longitudinal coaxial movement, a tube fixed on each stem and extending at right angles thereto, and a pair of lens holders, each formed with a stem telescoped within one of said tubes.

3. An ophthalmic attachment comprising a pair of brackets having means for engaging the lens rim of a spectacle frame, a member rotatably mounted on each bracket, means for attaching said members together in various longitudinal, co-axial, adjusted positions, a pair of accessory lens holders, and means for attaching said lens holders to said members in various adjusted positions relative to the axis of said members.

4. A pair of brackets, each bracket comprising a top wall and a front tongue and a rear tongue extending downwardly from the top wall and forming a channel therebetween, and said bracket being provided with a pair of spaced coaxial bearing sleeves extending from the top wall at opposite sides of and in front of the front tongue, a pair of members, each formed with a stem journalling in the bearings of one of said brackets, one of said members having a portion interfitted telescopically with a portion on the other member, a tube extending at right angles to each stem and disposed between the bearings of one of the brackets, and a pair of accessory lens holders, each formed with a radial stem received in one of the tubes.

5. A pair of brackets, each bracket comprising a top wall and a front tongue and a rear tongue extending downwardly from the top wall and forming a channel therebetween, and said bracket being provided with a pair of spaced coaxial bearing sleeves extending from the top wall at opposite sides of and in front of the front tongue, a pair of members, each formed with a stem journalling in the bearings of one of said brackets, one of said members having a portion interfitted telescopically with a portion on the other member, a tube extending at right angles to each stem and disposed between the bearings of one of the brackets, and a pair of accessory lens holders, each formed with a radial stem received in one of the tubes, and means for retaining the telescoping portions in various adjusted longitudinal positions.

6. A pair of brackets, each bracket comprising a top wall and a front tongue and a rear tongue extending downwardly from the top wall and forming a channel therebetween, and said bracket being provided with a pair of spaced coaxial bearing sleeves extending from the top wall at opposite sides of and in front of the front tongue, a pair of members, each formed with a stem journalling in the bearings of one of said brackets, one of said members having a portion interfitted telescopically with a portion on the other member, a tube extending at right angles to each stem and disposed between the bearings of one of the brackets, and a pair of accessory lens holders, each formed with a radial stem received in one of the tubes, and means for retaining the telescoping portions in various adjusted longitudinal positions, and means for retaining said stems in various adjusted positions relative to said tubes.

7. An ophthalmic attachment for spectacle frames comprising a pair of brackets having means to frictionally engage top portions of a spectacle frame, a member rotatably mounted on each bracket, means to connect said members to each other in coaxial relation and for longitudinal adjustment, each member being provided with an arm extending at right angles to said member, a lens holder on each arm and means to attach each lens holder to its arm for longitudinal adjustment toward and away from the member from which said arm extends.

8. An ophthalmic attachment for spectacle frames comprising a pair of brackets having means to frictionally engage top portions of a spectacle frame, a member rotatably mounted on each bracket, means to connect said members to each other in coaxial relation and for longitudinal adjustment, each member being provided with an arm extending at right angles to said member, a lens holder on each arm and means to attach each lens holder to its arm for longitudinal adjustment toward and away from the member from which said arm extends, and means for retaining said members in various longitudinal adjusted positions.

9. An ophthalmic attachment for spectacle frames comprising a pair of brackets having means to frictionally engage top portions of a spectacle frame, a member rotatably mounted on each bracket, means to connect said members to each other in coaxial relation and for longitudinal adjustment, each member being provided with an arm extending at right angles to said member, a lens holder on each arm and means to attach each lens holder to its arm for longitudinal adjustment toward and away from the member from which said arm extends, and means for retaining said members in various longitudinal adjusted positions, and means for retaining said lens holders on said arms in various adjusted positions.

10. An ophthalmic attachment for spectacle frames comprising a pair of similar brackets, each bracket comprising a top wall and a rear tongue extending downwardly from the top wall, a front tongue extending downwardly from the top wall, to form a channel between said tongues to receive a portion of the spectacle frame, said top wall having portions extending upwardly and beyond the tongues and portions extending forwardly from said extensions and forming aligned bearings on opposite sides and in front of the front tongue, a member rotatably mounted in the bearings of each bracket, said members having mutualy telescoping longitudinal extensible portions, an arm fixed to each member and extending at right angles thereto and being disposed in front of the front tongue and between the bearings of the bracket on which said member is mounted and a lens holder mounted on each arm.

11. An ophthalmic attachment for spectacle frames comprising a pair of similar brackets, each bracket comprising a top wall and a rear tongue extending downwardly from the top wall, a front tongue extending downwardly from the top wall, to form a channel between said tongues to receive a portion of the spectacle frame, said top wall having portions extending upwardly and beyond the tongues and portions extending forwardly from said extensions and forming aligned bearings on opposite sides and in front of the front tongue, a member rotatably mounted in the bearings of each bracket, said members having mutually telescoping longitudinal extensible portions, an arm fixed to each member and extending at right angles thereto and being disposed in front of the front tongue and between the bearings of the bracket on which said member is mounted and a lens holder mounted on each arm, each arm comprising a tubular portion and each lens holder comprising an annular rim and a radial stem extending from the rim and received within said tubular portion.

12. An ophthalmic attachment for spectacle frames comprising a pair of similar brackets, each bracket comprising a top wall and a rear tongue extending downwardly from the top wall, a front tongue extending downwardly from the top wall, to form a channel between said tongues to receive a portion of the spectacle frame, said top wall having portions extending upwardly and beyond the tongues and portions extending forwardly from said extensions and forming aligned bearings on opposite sides and in front of the front tongue, a member rotatably mounted in the bearings of each bracket, said members having mutually telescoping longitudinal extensible portions, an arm fixed to each member and extending at right angles thereto and being disposed in front of the front tongue and between the bearings of the bracket on which said member is mounted and a lens holder mounted on each arm, each arm comprising a tubular portion and each lens holder comprising an annular rim and a radial stem extending from the rim and received within said tubular portion, and means for retaining said mutually telescoping portions in various longitudinal adjusted positions.

13. An ophthalmic attachment for spectacle frames comprising a pair of similar brackets, each bracket comprising a top wall and a rear tongue extending downwardly from the top wall, a front tongue extending downwardly from the top wall, to form a channel between said tongues to receive a portion of the spectacle frame, said top wall having portions extending upwardly and beyond the tongues and portions extending forwardly from said extensions and forming aligned bearings on opposite sides and in front of the front tongue, a member rotatably mounted in the bearings of each bracket, said members having mutually telescoping longitudinal extensible portions, an arm fixed to each member and extending at right angles thereto and being disposed in front of the front tongue and between the bearings of the bracket on which said member is mounted and a lens holder mounted on each arm, each arm comprising a tubular portion and each lens holder comprising an annular rim and a radial stem extending from the rim and received within said tubular portion, and means for retaining said mutually telescoping portions in various longitudinal adjusted positions, and means for retaining each stem within the tube in which it is received in various longitudinal adjusted positions.

ALFRED POZARIK.

REFERENCES CITED

The following references are of record in the file of this patent:

UNITED STATES PATENTS

| Number | Name | Date |
| --- | --- | --- |
| 724,197 | Marshutz | Mar. 31, 1903 |
| 1,794,927 | Smith et al. | Mar. 3, 1931 |
| 1,899,905 | Uhlemann | Feb. 28, 1933 |
| 1,964,243 | Behr | June 26, 1934 |
| 2,286,219 | Martinek | June 16, 1942 |
| 2,443,249 | Jackson | June 15, 1948 |